United States Patent
Sachs et al.

(10) Patent No.: US 9,527,418 B2
(45) Date of Patent: Dec. 27, 2016

(54) SEMI RIGID PUSH/PULL VENTED ENVELOPE SYSTEM

(71) Applicant: Ford Global Technologies, LLC, Dearborn, MI (US)

(72) Inventors: Adam Sachs, Oak Park, MI (US); Johnathan Andrew Line, Northville, MI (US); S. M. Akbar Berry, Windsor, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 14/025,483

(22) Filed: Sep. 12, 2013

(65) Prior Publication Data

US 2015/0069811 A1    Mar. 12, 2015

(51) Int. Cl.
*B60N 2/56*    (2006.01)
*B60N 2/44*    (2006.01)

(52) U.S. Cl.
CPC ........... *B60N 2/5657* (2013.01); *B60N 2/4495* (2013.01); *B60N 2/565* (2013.01); *B60N 2/5642* (2013.01)

(58) Field of Classification Search
CPC ........... A47C 7/74; A47C 7/742; A47C 7/744; B60N 2/56; B60N 2/5621; B60N 2/5642; B60N 2/5657; B60N 2/565; B60N 2/4495
USPC ............... 297/180.1, 180.11, 180.13, 180.14
See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,720,141 A | 1/1988 | Sakamoto et al. |

(Continued)

FOREIGN PATENT DOCUMENTS

| | | |
|---|---|---|
| DE | 19857386 A1 | 6/2000 |
| EP | 0754590 | 1/1997 |

(Continued)

OTHER PUBLICATIONS

"Seat Comfort Systems," Installation Manual, KIT P/N: SCS00000C3, http://www.techwebasto.com/accessories_main/seat_accessories/g_scs_vent_install.pdf (date unknown) (7 pages).

(Continued)

*Primary Examiner* — Philip Gabler
(74) *Attorney, Agent, or Firm* — Vichit Chea; Price Heneveld LLP

(57) ABSTRACT

A vehicle seating assembly includes a seat back and a seat base. A shell is disposed in the seat base and includes a left leg support and a right leg support. A membrane is disposed over the shell and includes a plurality of perforations. The membrane and the shell define a cavity. An air channel is defined in a bottom wall of the shell. The air channel extends at least partially into the left leg support and the right leg support. A spacer material is disposed in the cavity. A fan is in communication with the air channel and is configured to move air through the channel, the spacer material, and the plurality of perforations.

18 Claims, 6 Drawing Sheets

(56) References Cited

U.S. PATENT DOCUMENTS

| | | |
|---|---|---|
| 4,915,447 A | 4/1990 | Shovar |
| 5,171,062 A | 12/1992 | Courtois |
| 5,174,526 A | 12/1992 | Kanigowski |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,978 B2 | 9/2006 | Ekern et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,229,129 B2 | 6/2007 | White et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 8,342,607 B2 | 1/2013 | Hofmann et al. |
| 8,360,517 B2 | 1/2013 | Lazanja et al. |
| 2002/0096915 A1* | 7/2002 | Haupt et al. ............ 297/180.13 |
| 2004/0195870 A1 | 10/2004 | Bohlender et al. |
| 2005/0200166 A1 | 9/2005 | Noh |
| 2006/0043777 A1 | 3/2006 | Friedman et al. |
| 2007/0120401 A1 | 5/2007 | Minuth et al. |
| 2007/0138844 A1* | 6/2007 | Kim ..................... 297/180.11 |
| 2008/0174159 A1 | 7/2008 | Kojima et al. |
| 2009/0066122 A1 | 3/2009 | Minuth et al. |
| 2009/0152909 A1 | 6/2009 | Andersson |
| 2009/0165263 A1 | 7/2009 | Smith |
| 2009/0322124 A1 | 12/2009 | Barkow et al. |
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2010/0327636 A1* | 12/2010 | Stoll et al. ................ 297/180.1 |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |

(56) References Cited

U.S. PATENT DOCUMENTS

| | | | |
|---|---|---|---|
| 2011/0248532 A1* | 10/2011 | Kim et al. ............... | 297/180.11 |
| 2011/0254335 A1 | 10/2011 | Pradier et al. | |
| 2011/0260506 A1 | 10/2011 | Kuno | |
| 2011/0260509 A1* | 10/2011 | Siu ........................... | 297/180.14 |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2012/0032486 A1 | 2/2012 | Baker et al. | |
| 2012/0037754 A1 | 2/2012 | Kladde | |
| 2012/0063081 A1 | 3/2012 | Grunwald | |
| 2012/0080914 A1 | 4/2012 | Wang | |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1 | 5/2012 | Brncick et al. | |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 | 10/2012 | Hontz et al. | |
| 2012/0261974 A1 | 10/2012 | Yoshizawa et al. | |
| 2013/0076092 A1 | 3/2013 | Kulkarni et al. | |

FOREIGN PATENT DOCUMENTS

| | | |
|---|---|---|
| EP | 0926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| EP | 2423040 A2 | 2/2012 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

M. Grujicic et al., "Seat-cushion and soft-tissue material modeling and a finite element investigation of the seating comfort for passenger-vehicle occupants," Materials and Deisgn 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

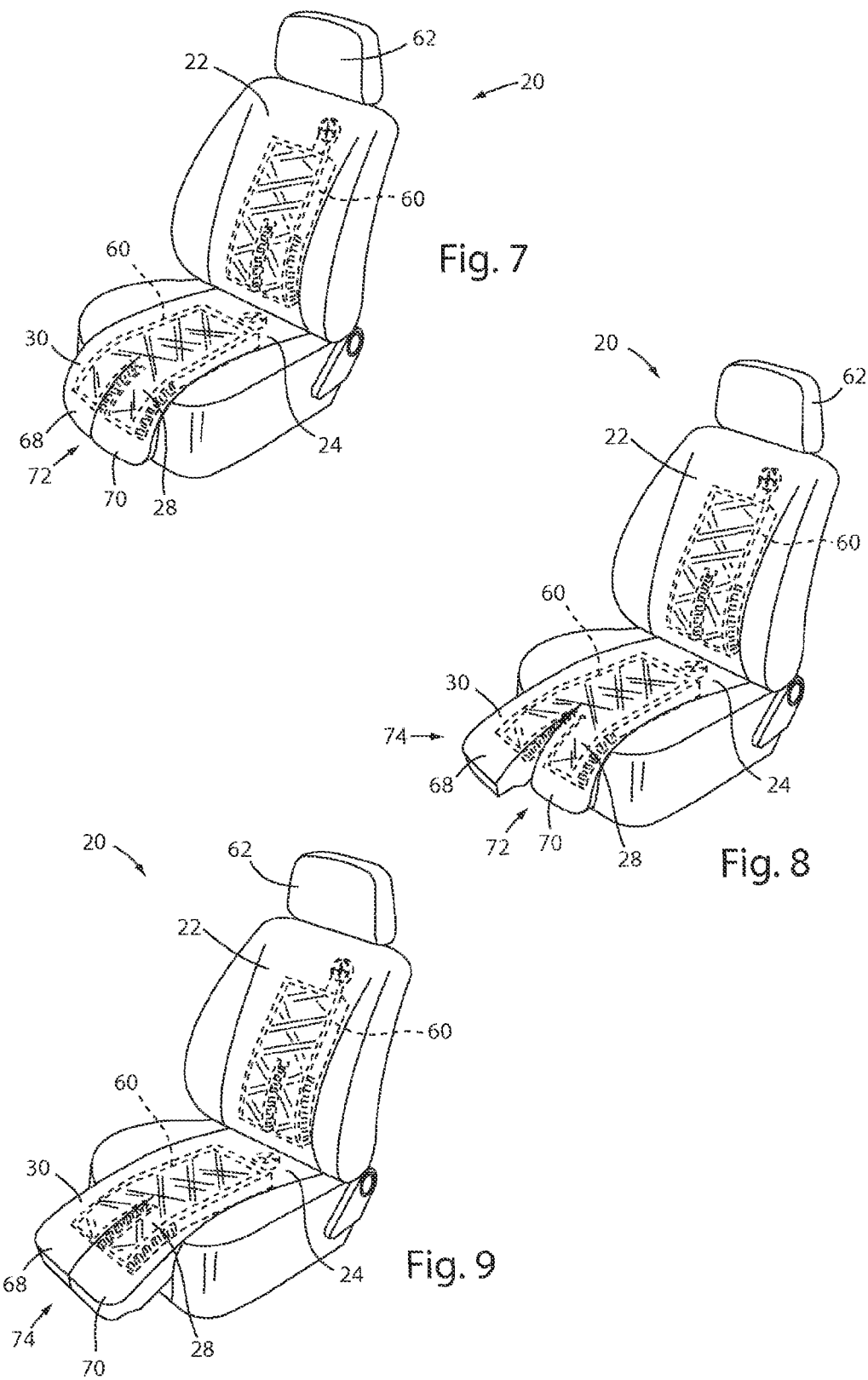

US 9,527,418 B2

SEMI RIGID PUSH/PULL VENTED ENVELOPE SYSTEM

FIELD OF THE INVENTION

The present invention generally relates to a vehicle seating assembly, and more particularly to a vehicle seating assembly having a vented envelope system for providing air flow to a vehicle passenger.

BACKGROUND OF THE INVENTION

Vehicles that include improved air flow technology increase comfort and value to the consumer.

SUMMARY OF THE INVENTION

According to one aspect of the present invention, a vehicle seating assembly includes a seat back and a seat base. A shell is disposed in the seat base and includes a left leg support and a right leg support. A membrane is disposed over the shell and includes a plurality of perforations. The membrane and the shell define a cavity. An air channel is defined in a bottom wall of the shell. The air channel extends at least partially into the left leg support and the right leg support. A spacer material is disposed in the cavity. A fan is in communication with the air channel and is configured to move air through the channel, the spacer material, and the plurality of perforations.

According to another aspect of the present invention, a vehicle seating assembly includes a seat base having a shell with a bottom wall defining an air channel. A membrane is disposed over the shell and includes a plurality of perforations. First and second flexible and independently movable leg portions extend forward from the shell. A fan is in communication with the air channel and is configured to move air through the plurality of perforations.

According to yet another aspect of the present invention, a vehicle seating assembly includes a semi-rigid shell disposed in at least one of a seat back or a seat base and includes at least one flexible wall. A membrane is disposed over the shell and includes a plurality of perforations. An air channel is disposed in a bottom wall of the shell. A fan is in communication with the air channel and is configured to move air through the plurality of perforations.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a front perspective view of the vehicle seat having the vented system in the vertical position;

FIG. 8 is a front perspective view of the vehicle seat having the vented system having one support leg in the vertical position and one support leg in the horizontal position according to one embodiment of the present invention;

FIG. 9 a front perspective view of the vehicle seat having the vented system and having the legs in the horizontal position;

DETAILED DESCRIPTION OF THE EMBODIMENTS

Figure 1:
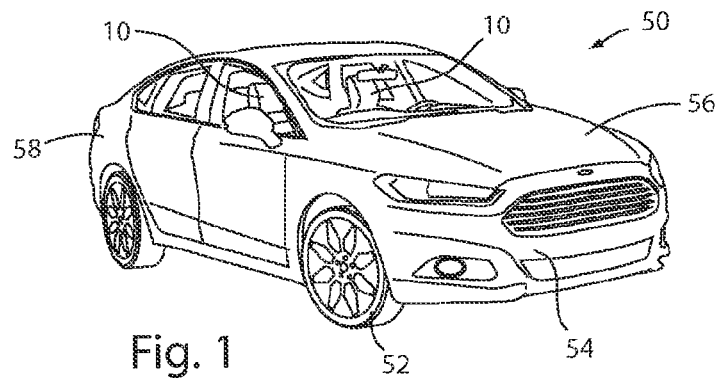
FIG. 1 is a front perspective view of a vehicle having a vehicle seat according to one embodiment of the present invention.
Figure 2:
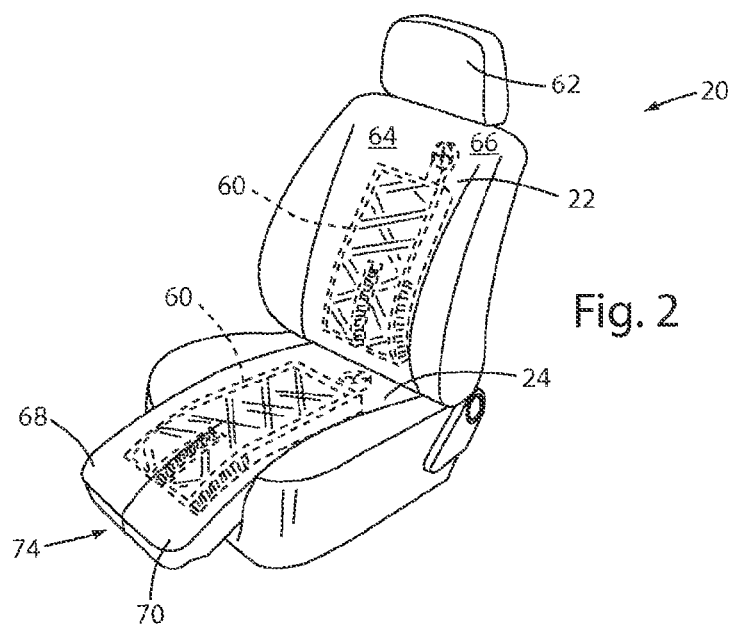
FIG. 2 is a front perspective view of the vehicle seat having a vented system according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-16, reference numeral 20 generally designates a vehicle seating assembly including a seat back 22 and a seat base 24. A shell 26 is disposed in the seat base 24 and includes a left leg support 28 and a right leg support 30. A membrane 32 is disposed over the shell 26 and includes a plurality of perforations 33. The membrane 32 and the shell 26 define a cavity 34. An air channel 36 is defined in a bottom wall 38 of the shell 26. The air channel 36 extends at least partially into the left leg support 28 and the right leg support 30. A spacer material 40 is disposed in the cavity 34. A fan 42 is in communication with the air channel 36 and is configured to move air through the air channel 36, the spacer material 40, and the plurality of perforations 33.

Referring again to FIG. 1, a vehicle 50 includes the vehicle seating assembly 20 and also includes other features, such as multiple wheels 52, a bumper 54, a front end 56, and a rear end 58. The vehicle 50 may be of any type, including a compact vehicle, a mid-size vehicle, a sport utility vehicle, a mini or full size van, or any type of truck. As illustrated in the embodiment shown in FIG. 2, the vehicle seating assembly 20 includes the seat base 24 and the seat back 22. In the illustrated embodiment, each of the seat base 24 and the seat back 22 includes a vented system 60. The vehicle seating assembly 20 may also include a headrest 62 and a coverstock 64. Moreover, the coverstock 64 is disposed completely over the seat back 22 and the seat base 24. The coverstock 64 is configured to provide a uniform look and feel to the vehicle seating assembly 20. The coverstock 64 also forms a passenger engagement surface 66 on the top surface of both the seat back 22 and the seat base 24 of the vehicle seating assembly 20. Additionally, the seat base 24, as shown in the embodiment illustrated in FIG. 2, may include a first leg portion 68 and a second leg portion 70. Further, the first and second leg portions 68, 70 are configured to be in a first position 72 corresponding with the first and second leg portions 68, 70 being in a substantially horizontal position, or a second position 74 corresponding with the first and second leg portions 68, 70 being in a substantially vertical position. The first and second leg portions 68, 70 may also move independently of one another, such that one of the first and second leg portions 68, 70 can be in the first position 72 while the other of the first and second leg portions 68, 70 is in the second position 74, and are configured to provide support for an upper and lower leg of a vehicle passenger. As shown in the embodiment shown in FIG. 2, the vented system 60 may be included in one or both of the seat base 24 and the seat back 22.

Figure 3:
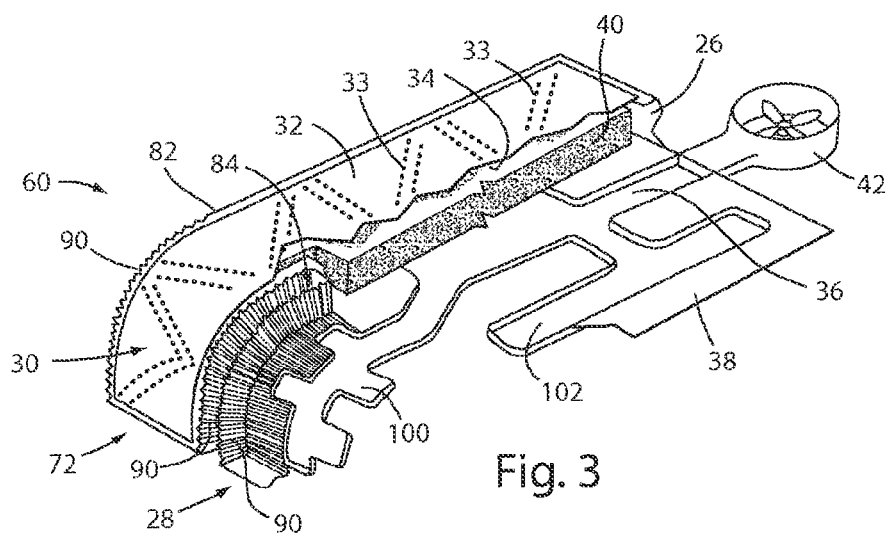
FIG. 3 is a top perspective view of the vented system according to one embodiment of the present invention.

Referring now to the embodiment as shown in FIG. 3, the vented system 60 includes the semi-rigid shell 26, which is disposed in either of the seat base 24 or the seat back 22. The shell 26 is generally a thin, non-permeable shell and includes at least one flexible perimeter sidewall 82, which allows for flexibility. The shell 26 is generally made of a polyurethane foam, but it is also contemplated that the shell 26 is made of another type of foam, a plastic polymer, or other non-permeable materials, as used by one of ordinary skill in the art. Moreover, the shell 26 is generally rectangular in shape, except for an elongate slot 84, which is disposed on a forward portion of the seat base 24, and defines the right leg support 30 and the left leg support 28. The shell 26 is generally sized to fit in the seat back 22 or the seat base 24. The shell 26 includes the bottom wall 38, having the perimeter sidewall 82 extending upwards from the bottom wall 38, and an open top construction. The shell 26 may also include the air channel 36. The air channel 36 is operably coupled to the fan 42 and is configured to direct air flow throughout the entire shell 26. The bottom wall 38 of the shell 26 may include the at least one air channel 36. In the embodiment shown in FIG. 3, the air channel 36 is molded into the bottom wall 38 of the shell 26. However, it is also contemplated that the air channel 36 may be partially molded into the bottom wall 38, disposed in abutting contact with the bottom wall 38, disposed adjacent to the bottom wall 38, or in any other orientation as known by one of ordinary skill in the art.

Referring again to the embodiment shown in FIG. 3, the vented system 60 further includes the non-permeable membrane 32, which is disposed over the shell 26 and along with the shell 26. Specifically, the non-permeable membrane 32 is operably coupled with the perimeter sidewall 82 of the shell 26 and forms a surface opposite the bottom wall 38 of the shell 26, forming the cavity 34. The non-permeable membrane 32 is generally a thin film. However, it is also contemplated that the non-permeable membrane 32 may be made of any other material as known by one of ordinary skill in the art that provides a non-permeable barrier.

Figure 4:
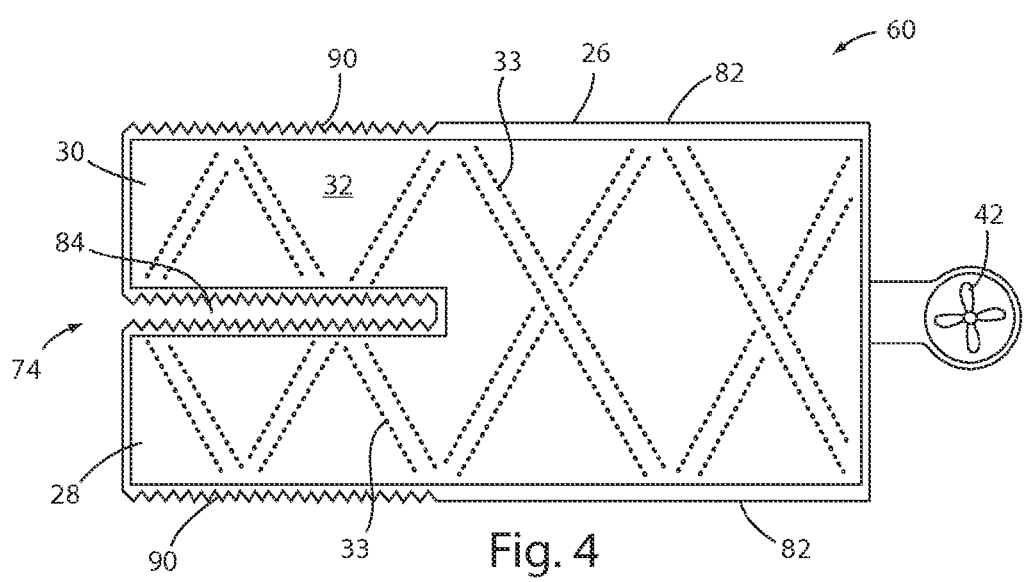
FIG. 4 is a top plan view of the vented system of FIG. 3.

Referring now to the embodiment shown in FIGS. 3 and 4, the membrane 32 generally includes the plurality of perforations 33, which are configured to let air in and out of the cavity 34. As shown in the embodiment illustrated in FIG. 4, the perforations 33 are generally arranged in a repeating diamond-shaped pattern in order to create optimal air flow in and out of the envelope. As shown in the embodiment illustrated in FIG. 3, the repeating diamond-shaped pattern of the perforations 33 are such that each of the left and right leg supports 28, 30 include approximately half of the diamond-shaped pattern of each of the first and second leg portions 68, 70. However, it is also contemplated that the perforations 33 may be arranged in a staggered orientation or other orientation as known by one of ordinary skill in the art to provide optimal air flow to the vehicle passenger. Moreover, as shown in the embodiment illustrated in FIG. 3, the plurality of perforations 33 are disposed along the entire vented system 60, in order to provide air flow to the entire surface of the seat base 24 or the seat back 22.

Referring again to the embodiment shown in FIGS. 3 and 4, the perimeter sidewall 82 of the shell 26 is disposed around both the right leg support 30 and the left leg support 28 and includes a plurality of accordion-style bellows 90, which are configured to allow the left and right leg supports 28, 30 to be moved from the first position 72 and the second position 74. In the first position 72, the left and right leg supports 28, 30 are in a substantially vertical position. In the second position 74, the left and right leg supports 28, 30 are in a substantially horizontal position. Specifically, the accordion-style bellows 90 of the left and right leg supports 28, 30, are configured to expand and contract in order to provide easy and smooth movement from the first position 72 to the second position 74 and vice versa. The accordion-style bellows 90 are in a compressed state when the left and right leg supports 28, 30 are in the second position 74, and are in a stretched state when the left and right leg supports 28, 30 are in the first position 72. Each of the left and right leg supports 28, 30 include the accordion-style bellows 90, such that the left and right leg supports 28, 30 can be moved from the first position 72 and to the second position 74 independently of one another. The accordion-style bellows 90 begin on a lower end of both the left and right leg supports 28, 30 and extend around the entire left and right leg supports 28, 30 and, as shown in the embodiment illustrated in FIG. 3, may be in abutting contact with the air channel 36.

Referring again to the embodiment shown in FIG. 3, the spacer material 40 may be disposed inside of the cavity 34. The spacer material 40 creates comfort for the vehicle passenger on the seat base 24 or the seat back 22, and is generally disposed in the cavity 34 between the membrane 32 and the bottom wall 38 of the shell 26. Moreover, the spacer material 40 also provides rigidity for the vented system 60 in order to prevent the collapsing of the cavity 34 under the weight of a vehicle passenger. Specifically, the spacer material 40 is a permeable material, such that air is able to pass through the spacer material 40. The permeable nature of the spacer material 40 allows air from the air channel 36 to be passed through the spacer material 40 and through the plurality of perforations 33 in the membrane 32 in order to provide air flow to the vehicle passenger. The spacer material 40 also provides the rigidity necessary to allow the fan 42 to move air through the air channel 36 and the plurality of perforations 33 in the membrane 32 without ballooning the cavity 34 during the movement of air through the vented system 60 and allowing the cavity 34 to maintain shape during movement of air through the vented system 60.

Figure 5:
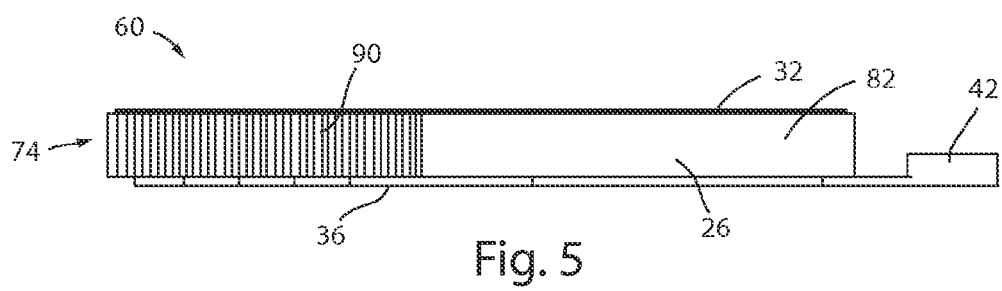
FIG. 5 is a side plan view of the vented system of FIG. 4.

Referring now to the embodiments shown in FIGS. 4 and 5, when the left and right leg supports 28, 30 are in the second position 74, the vented system 60 is a generally flat structure having a generally rectangular perimeter. The rectangular perimeter is interrupted by the elongate slot 84 which separates the right leg support 30 and the left leg support 28. Moreover, as shown in the embodiment illustrated in FIG. 5, the vented system 60 is a relatively thin structure having the accordion-style bellows 90 disposed along the perimeter sidewall 82 of the left and right leg supports 28, 30. The thin structural composition of the vented system 60 allows for easy packaging to the vented system 60 in the seat base 24 or the seat back 22.

Figure 6:
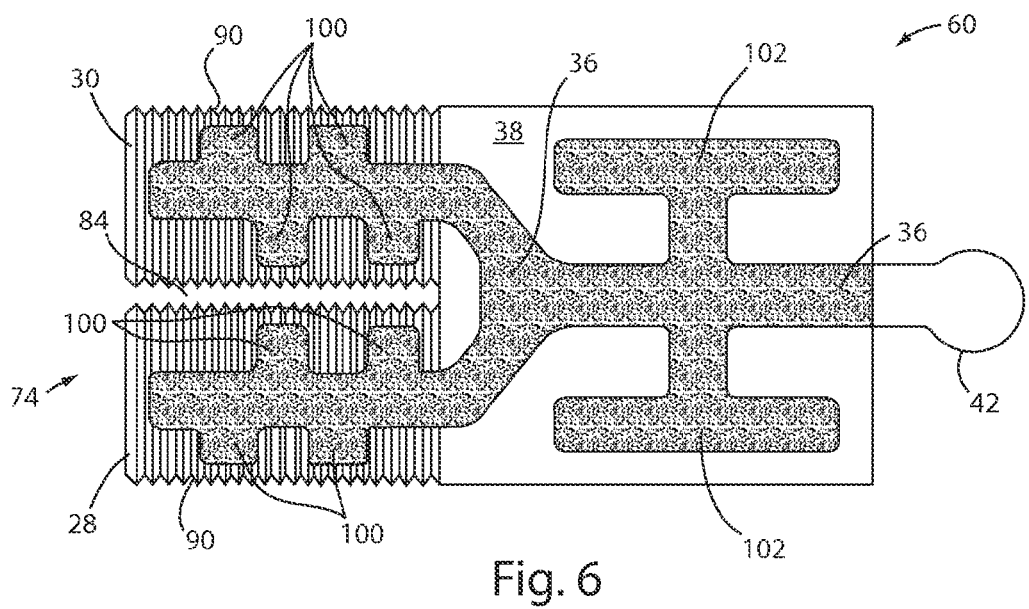
FIG. 6 is a top plan view of the vented system of FIG. 4 having a membrane removed.

Referring now to the embodiment shown in FIG. 6, the fan 42 is disposed in a rearward portion of the seat base 24 or the seat back 22, and is generally disposed behind the vented system 60. The fan 42 is generally disposed approximately centrally on the opposite end from the left and right leg supports 28, 30. Moreover, the air channel 36 is operably coupled to the fan 42 and extends centrally down the vented system 60 until reaching the right leg support 30 and the left leg support 28. The air channel 36 then splits and extends separately into both the right leg support 30 and the left leg support 28. The portion of the air channel 36 in the right leg support 30 and the portion of the air channel 36 in the left leg support 28 each include multiple protrusions 100 designed to precipitate air flow throughout the entire left and right leg supports 28, 30. Moreover, the air channel 36 also includes an I-shaped protrusion 102, which extends from both sides of the centrally disposed air channel 36. The I-shaped protrusion 102 allows air to be moved throughout the entire seat base 24.

Referring now to the embodiments shown in FIGS. 7-9, the vehicle seating assembly 20 is configured to move the right leg support 30 and the left leg support 28 from the first position 72 to the second position 74. Specifically, the left and right leg supports 28, 30 begin in the first position 72 corresponding with the left and right leg supports 28, 30 being in a substantially vertical position and perpendicular with a vehicle floor. When activated by the vehicle passenger, the accordion-style bellow 90 of the left and right leg supports 28, 30 contract and expand in order to move the left and right leg supports 28, 30 from the first position 72 to the second position 74. In the second position 74, the left and right leg supports 28, 30 are level with the seat base 24 and substantially parallel to the vehicle floor. The left and right leg supports 28, 30 in the second position 74 provide additional leg support for the upper leg and lower leg of the passenger and allow the vehicle passenger to extend his or her legs out horizontally for a more comfortable position. Additionally, as shown in the embodiment illustrated in FIG. 8, the right leg support 30 and the left leg support 28 may be configured to move independently of each other such that the right leg support 30 may be in the first position 72 while the left leg support 28 is in the second position 74 or vice versa. Moreover, as shown in the embodiments illustrated in FIGS. 7-9, when the right leg support 30 is in the first position 72, the first leg portion 68 of the vehicle seating assembly 20 is also in a substantially vertical position, and when the right leg support 30 is in the second position 74, the first leg portion 68 of the vehicle seating assembly 20 is also in a substantially horizontal position. Similarly, when the left leg support 28 is in the first position 72, the second leg portion 70 of the vehicle seating assembly 20 is also in a substantially vertical position, and when the left leg support 28 is in the second position 74, the second leg portion 70 of the vehicle seating assembly 20 is also in a substantially horizontal position.

Figure 10:
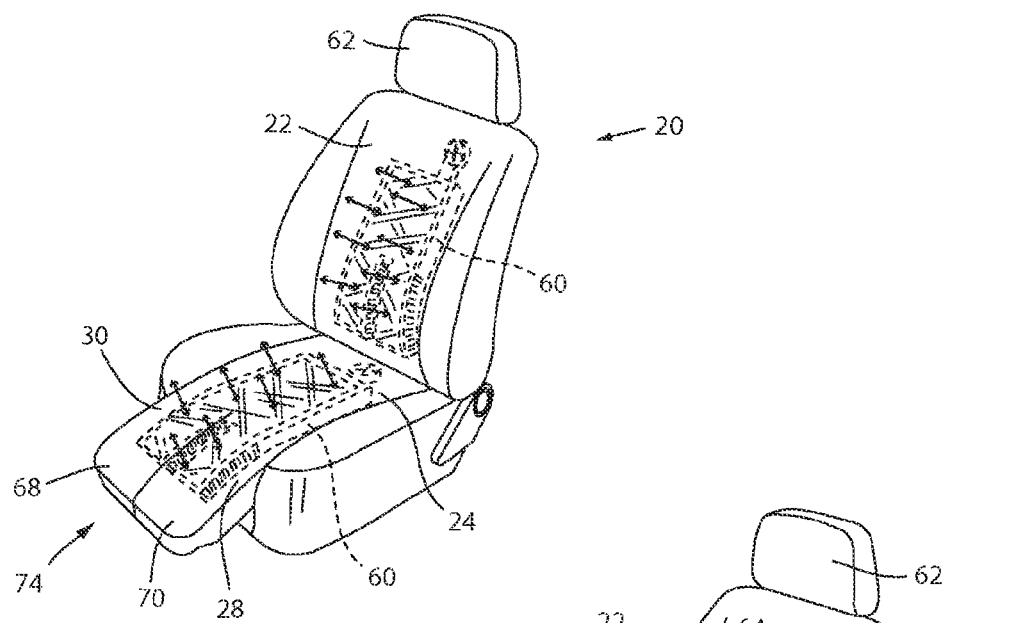
FIG. 10 is a front perspective view of the vehicle seat having the vented system in operation.
Figure 11:
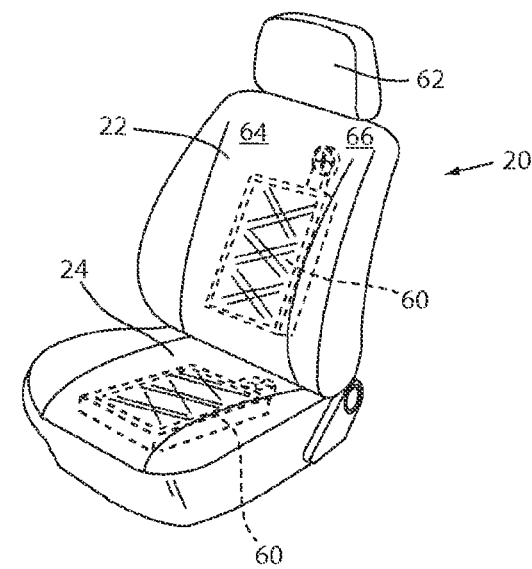
FIG. 11 is a front perspective view of the vehicle seat having a vented system according to another embodiment of the present invention.

In operation, and as further shown in the embodiment illustrated in FIG. 10, when the vented system 60 is activated, the fan 42 is turned on and moves (draws or blows) air through the air channel 36. The air then flows through the spacer material 40 and through the perforations 33 in the non-permeable membrane 32. The air then flows through the coverstock 64, which may further include a plurality of perforations configured to be aligned with the perforations 33 in the membrane 32 in order to provide ventilation to the vehicle passenger. However, it is also contemplated that the coverstock 64 may be made of a permeable material such that air flows from the perforations 33 on the membrane 32 and is delivered to the vehicle passenger. The perimeter sidewall 82 of the shell 26, along with the spacer material 40 disposed inside of the cavity 34, provide rigidity to the cavity 34 in order to prevent the cavity 34 from ballooning or bottoming out during the movement of air from the fan 42.

Referring now to the embodiments shown in FIGS. 11-16, the vehicle seating assembly 20 may include many of the same features as described above, including the seat base 24, the seat back 22, the coverstock 64, the headrest 62, and the vented system 60 disposed in the seat base 24 or the seat back 22. As shown in the embodiment illustrated in FIG. 11, the vented system 60 may be disposed in one or both of the seat back 22 and the seat base 24 similar to the embodiment described above with respect to FIG. 2. However, the vehicle seating assembly 20 as shown in the embodiment illustrated in FIG. 10 does not include the first and second leg portions 68, 70, and instead includes a more traditional seat base 24 having a generally rectangular surface.

Figure 12:
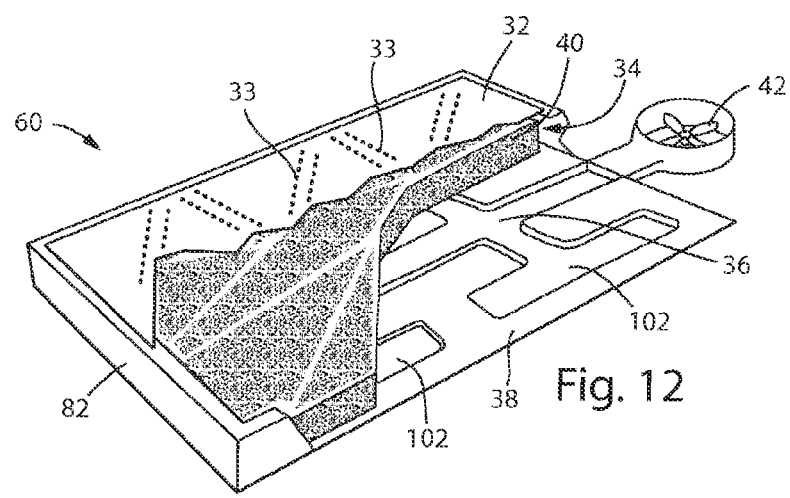
FIG. 12 is a top perspective view of the vented system according to the embodiment shown in FIG. 2 with a portion of a carrier removed.
Figure 13:
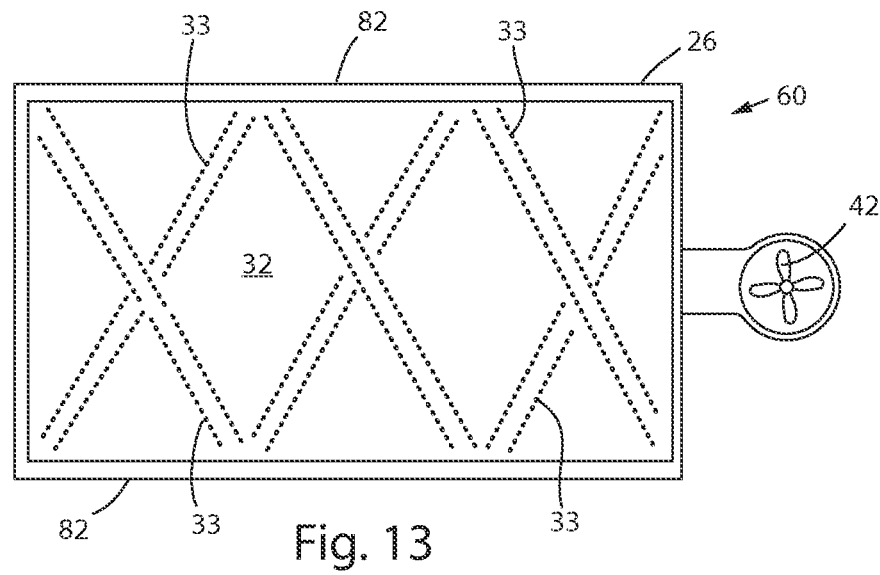
FIG. 13 is a top plan view of the vented system of FIG. 11.
Figure 14:
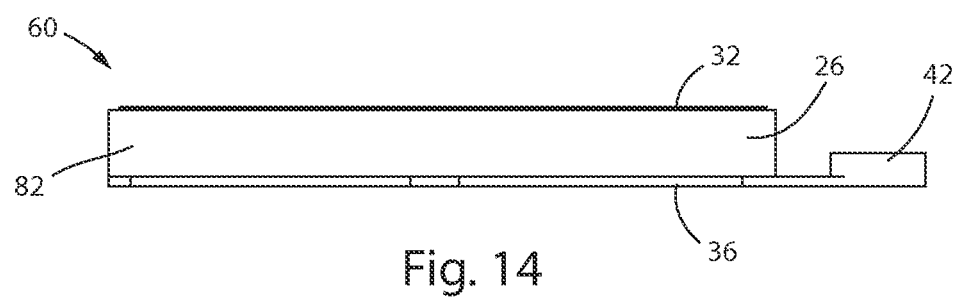
FIG. 14 is a side plan view of the vented system of FIG. 12.

Referring specifically to FIGS. 12-14, similar to the previous embodiment illustrated in FIGS. 3-5, the vented system 60 may include the non-permeable shell 26, the non-permeable membrane 32 disposed over the shell 26 defining the cavity 34, the plurality of perforations 33 in the membrane 32, the air channel 36 disposed inside of the shell 26, and the fan 42 operably coupled to the air channel 36 and configured to move air through the plurality of perforations 33. However, the embodiment shown in FIG. 8 does not include the left and right leg supports 28, 30, and instead is a rectangular structure. Moreover, as shown in the embodiments illustrated in FIGS. 12 and 13, and similar to the embodiments shown in FIGS. 3 and 4 and described above, the vented system 60 includes the perforations 33 in a repeating diamond-shape on the non-permeable membrane 32 and also is a generally thin structure in order to allow for easy packaging of the venting system 60 into the seat base 24 or the seat back 22.

Figure 15:
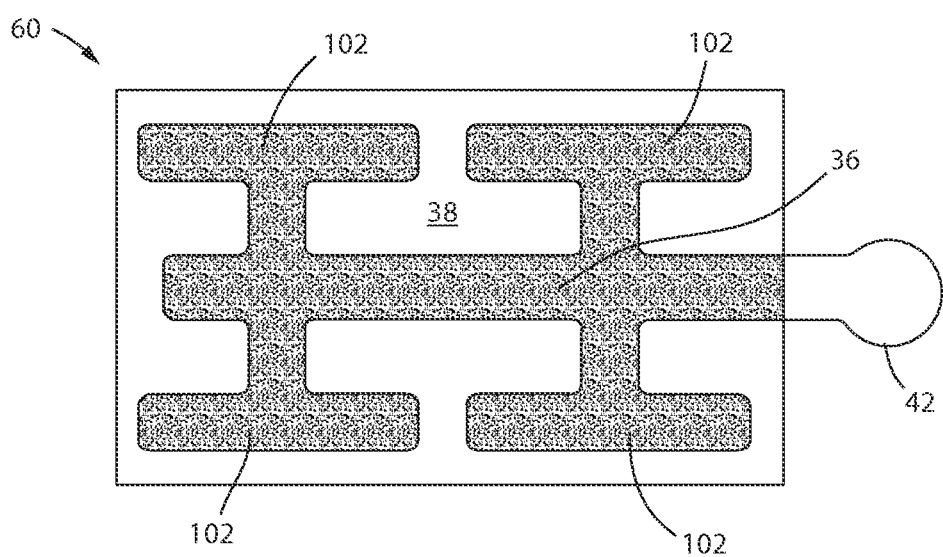
FIG. 15 is a top plan view of the vented system of FIG. 12 having the membrane removed.

Referring now to the embodiment shown in FIG. 15, the air channel 36 begins similarly to the embodiment as described with respect to FIG. 6, having the air channel 36 operably coupled to the fan 42, which is disposed centrally on one end of the vented system 60. However, in the embodiment shown in FIG. 15, the air channel 36 extends to the other end of the vented system 60 opposite the fan 42. In addition to the first I-shaped protrusion 102, as described above with respect to the embodiment shown in FIG. 6, the embodiment shown in FIG. 15 includes a second I-shaped protrusion 102 extending from both sides of the air channel 36. The first and second I-shaped protrusions 102 are configured to provide air flow throughout the entire vented system 60.

Figure 16:
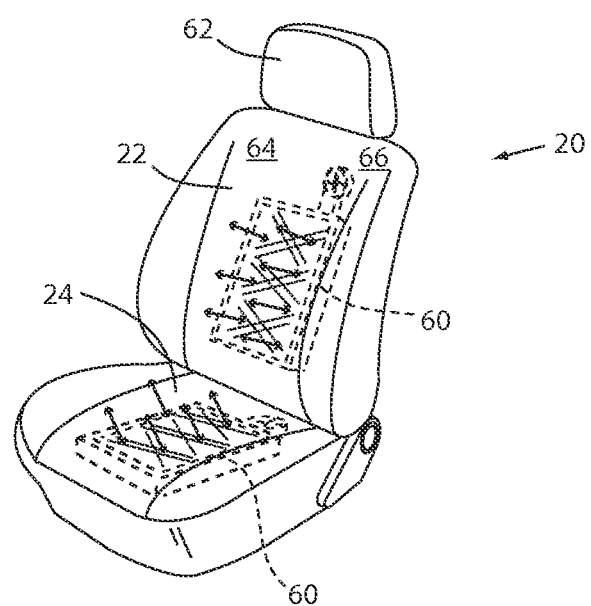
FIG. 16 is a front perspective view of the vehicle seat having the vented system according to one embodiment of the present invention in operation.

Referring now to the vehicle seating assembly 20 as shown in FIG. 16, the embodiment of a vented system 60 as shown in FIG. 15 can also be used. The venting system 60 of FIG. 15 operates similarly to the venting system 60 shown in FIG. 2, but lacks distinct left and right leg supports 28, 30. Specifically, when the vented system 60 is activated, the fan 42 moves air through the air channel 36, wherein the air then flows through the spacer material 40 and the perforations 33 on the non-permeable membrane 32. Again, the coverstock 64 may include a plurality of perforations aligned with the perforations 33 in the membrane 32 in order to distribute air to the vehicle passenger. The thin walls of the shell 26, along with the spacer material 40, allow the vented system 60 to have the necessary rigidity in order to prevent the cavity 34 from bottoming out or ballooning during operation.

Yet another aspect of the present invention is to provide improved air flow technology in order to increase comfort to the vehicle passenger. Prior ventilation systems include vents on a small portion of the seat or systems which move air through foam from under the seat. Having the air travel through the foam to reach the vehicle passenger causes inefficiencies. In addition, prior art systems are designed to work with a standard polyurethane cushioned foam. If foam was not used in the seat, or a different foam type was used, the prior art system would not work. The present invention uses a thin, non-permeable shell which easily fits into the seat base or the seat back. The non-permeable membrane is disposed over the shell creating the cavity. The air channel is disposed inside of the cavity and operably coupled to the fan. The fan is configured to move air through the air channel and through the perforations in the non-permeable membrane in order to distribute and deliver the air flow to the vehicle passenger.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a seat back;
   a seat base;
   a shell disposed in the seat base and including a left leg support and a right leg support;
   a membrane disposed over the shell and including a plurality of perforations wherein the membrane and the shell define a cavity;
   a main air channel defined by elongate walls disposed below a bottom wall of the shell, the main air channel extending at least partially into the left leg support and the right leg support and includes side channels extending from each side of the main air channel in each of the left leg support and the right leg support, wherein the left leg support and the right leg support further include perimeter sidewalls having a flexible accordion-style configuration that allows for independent movement of the left leg support and the right leg support;
   a spacer material disposed in the cavity; and
   a fan in communication with the air channel and configured to move air through the channel, the spacer material, and the plurality of perforations.

2. The vehicle seating assembly of claim 1, wherein the shell includes flexible perimeter sidewall portions.

3. The vehicle seating assembly of claim 1, wherein a forward portion of the shell includes an elongate slot.

4. The vehicle seating assembly of claim 1, wherein the plurality of perforations are arranged in a repeating diamond-shaped pattern.

5. A vehicle seating assembly comprising:
   a seat base having a shell with a bottom wall including a recess defining a central air channel including laterally opposing side channels;
   a membrane disposed over the shell and including a plurality of perforations;
   first and second independently movable leg portions, wherein the central air channel branches into each of the first and second independently movable leg portions, each branch including offset and opposing side channels, the leg portions extending forward from the shell with accordion-style sidewalls; and
   a fan that moves air through the perforations.

6. The vehicle seating assembly of claim 5, wherein the membrane and the shell form a cavity that includes a spacer material.

7. The vehicle seating assembly of claim 6, wherein the spacer material is permeable.

8. The vehicle seating assembly of claim 5, wherein a forward portion of the shell includes an elongate slot.

9. The vehicle seating assembly of claim 5, wherein the air channel extends into both the first and second flexible and independently movable leg portions.

10. The vehicle seating assembly of claim 5, further comprising:
a coverstock disposed over the membrane.

11. The vehicle seating assembly of claim 5, wherein the plurality of perforations are arranged in a repeating diamond-shaped pattern.

12. The vehicle seating assembly of claim 5, wherein the fan is disposed behind a rear end of the shell.

13. A vehicle seating assembly comprising:
a semi-rigid shell disposed in at least one of a seat back and a seat base;
a perforated membrane disposed over the shell;
a main air channel extending into left and right leg supports and defined in a bottom wall of the shell;
lateral side channels extending from opposing sides of the main air channel; and
a fan in communication with the air channel that moves air through the perforations.

14. The vehicle seating assembly of claim 13, wherein the semi-rigid shell is disposed in the seat base and includes a left leg portion and a right leg portion.

15. The vehicle seating assembly of claim 14, wherein the air channel extends into both the left leg portion and the right leg portion.

16. The vehicle seating assembly of claim 13, wherein the membrane and the shell define a cavity that includes a spacer material.

17. The vehicle seating assembly of claim 13, wherein the fan is disposed behind a rear end of the shell.

18. The vehicle seating assembly of claim 13, wherein the plurality of perforations are arranged in a repeating diamond-shaped pattern.

* * * * *